United States Patent [19]

Cass

[11] E Re. 28,992

[45] Reissued Oct. 5, 1976

[54] BOOT SEAL CONSTRUCTIONS FOR RACK AND PINION GEAR

[75] Inventor: Richard Cass, Birmingham, Mich.

[73] Assignee: TRW Inc., Cleveland, Ohio

[22] Filed: Apr. 11, 1975

[21] Appl. No.: 567,272

Related U.S. Patent Documents

Reissue of:

[64] Patent No.: 3,762,740
Issued: Oct. 2, 1973
Appl. No.: 196,977
Filed: Nov. 9, 1971

[52] U.S. Cl. ..... 280/96
[51] Int. Cl.[2] ..... B62D 7/00
[58] Field of Search..... 280/90, 96; 184/1 R, 184/5; 251/57; 137/571; 267/35, 65

[56] References Cited

UNITED STATES PATENTS

| | | | |
|---|---|---|---|
| 1,915,304 | 6/1933 | Forsyth | 267/35 |
| 2,462,659 | 2/1949 | Molotzak | 184/5 |
| 3,357,512 | 12/1967 | Wilson | 267/65 R |

FOREIGN PATENTS OR APPLICATIONS

| | | | |
|---|---|---|---|
| 1,916,993 | 10/1970 | Germany | 280/96 |

*Primary Examiner*—M. H. Wood, Jr.
*Assistant Examiner*—Terrance L. Siemens

[57] ABSTRACT

A boot seal for rack and pinion steering gear assemblies having an integrally formed attachment opening for a fluid transfer tube, the opening being formed either as a nipple on the boot seal or as a clamp associated opening through the end of the seal.

3 Claims, 4 Drawing Figures

BOOT SEAL CONSTRUCTIONS FOR RACK AND PINION GEAR

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to steering assemblies and more particularly to a boot seal for said steering assemblies having a molded attachment point for a fluid transfer tube.

2. Prior Art

Steering gear assemblies, particularly of the rack and pinion type, incorporate a tubular body member through which a rack bar projects out of the open ends of the tubular member. In order to seal the open end of the member, and to seal the area of the rack bar which is allowed to move in and out of the tubular member, a boot seal is generally provided, the boot having one axial end thereof sealingly attached in circumferential engagement with the bar or a tie rod attached to the end of the bar and the other end thereof sealingly attached in circumferential engagement with the tubular member. The seal is generally of the boot or bellows type which can accommodate both axial movement and lateral movement of a tie rod with respect to the tubular member. Oftentimes the tubular member terminates in a movable joint member interiorly of the seal, the movable joint member attaching the rack bar to a tie rod in an articulatable joint. Incorporating the joint interiorly of the seal allows the boot seal to function as a protective cover for this joint. Therefore, the seal must be able to accommodate both axial movement of the rack bar and lateral movement of the tie rod with respect to the rack bar.

As the rack bar moves axially, during steering, the bellows or boot seal must accommodate expansion and contraction of its inner dimensions. In order to allow this, while maintaining a seal, it is necessary to provide for escape of fluid pressure from the interior of the seal.

In some embodiments, this has been accomplished by allowing the pressure to move through the tube which receives the rack bar from one axial end thereof to the other. However, in certain rack and pinion steering assemblies, particularly power steering assemblies, it is not feasible to allow fluid movement from one end of the rack tube to the other. Specifically in power steering assemblies, portions of the rack tube are used as the power cylinder and the presence of a moving piston around the rack bar sealed against the inner diameters of the rack tube prevents fluid pressure transference along the interior of the rack tube.

It has been suggested, in those cases, to provide a separate fluid transfer tube extending from one boot seal to the other so as to accommodate pressure balancing between the two seals. Generally when one seal is collapsing, the other is expanding and therefore, the provision of a transfer tube communicating the interior of the two seals allows for pressure balancing in the seals without leakage to the exterior of the system.

Heretofore, most transfer tubes have terminated in fitted connections with bores through the end housings supporting the rack tube. Portions of these end housings form the attachment point for the rack tube associated end of the boot seal. Oftentimes, one of the end housings can comprise a portion of the pinion housing. The use of housing bores to communicate the interior of the seals with the interior of the tube requires considerable machining of the housing units to provide a bore from the exterior thereof to the end thereof interiorly of the attachment point of the boot seal to the housing member. This machining adds greatly to the expense of the steering system.

SUMMARY

This invention overcomes the disadvantage of the attachment of the prior art transfer tubes by providing for attachment of the transfer tube directly to the boot seal. In the two embodiments illustrated, the attachment is through a molded portion of the boot seal. In the first embodiment, a portion of the exterior of the seal, preferably one of the outer corrugations of the bellows, has a nipple molded thereon, the nipple having a bore therethrough communicating to the interior of the bellows. Thereafter, the end of the transfer tube is mounted on the nipple. The outer diameter of the nipple and the inner diameter of the tube may have mating configurations to provide an interlock, or the tube may be clamped to the nipple.

In another embodiment, the attachment for the transfer tube to the bellows or boot seal is provided through the end of the boot seal that is attached to the housing. Normally, a circumferential clamp is used to attach the end of the boot seal to the housing and the illustrated embodiment provides for a molded opening or bulge in the axial end of the boot seal which receives the end of the transfer tube, the clamp extending around the boot seal in the area of the bulge so as to enclamp both the bulged area and the transfer tube to the outer surface of the housing. The molded bulge may have an opening therethrough for receipt of the tube, thereby still providing a portion of the axial end of the boot seal for contact with the outer surface of the housing, or the bulge may have a groove in its inner diameter surface which receives the tube, thereby providing a connection where the surface of the transfer tube contacts the housing outer surface.

It is therefore an object of this invention to provide a new method of attaching pressure transfer tubes used in steering assemblies.

It is another object of this invention to provide a rack and pinion steering assembly with a transfer tube communicating to the interiors of the boot seals at the axial ends of the rack bar tube, the communication being through openings through the boot seals.

It is yet another and more specific object of this invention to provide a boot seal-transfer tube attachment for steering gear assemblies wherein the boot seal is provided with a molded opening thereinto dimensioned to receive a portion of the transfer tube.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which.

DESCRIPTION OF THE PREFERRED EMBODIMENTS

Figure 1:
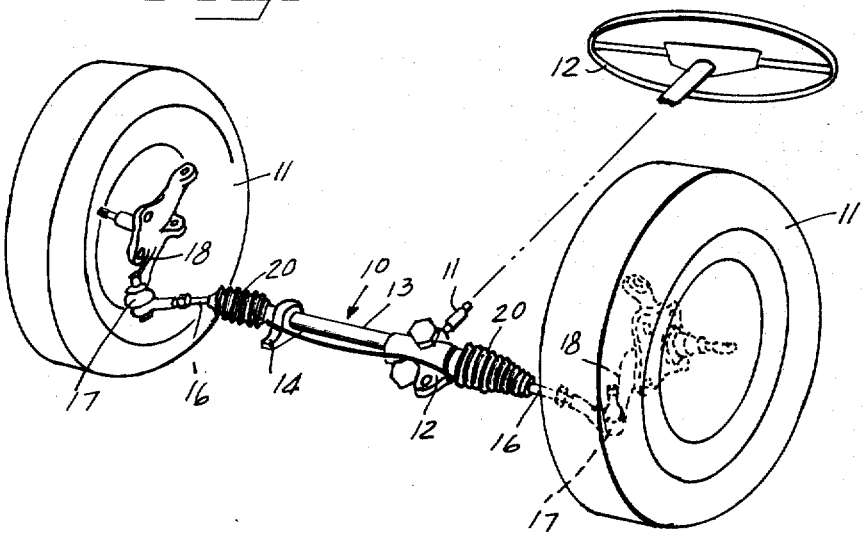
FIG. 1 is a fragmentary, perspective view of a rack and pinion steering gear assembly for the dirigible wheels of a vehicle.
Figure 2:
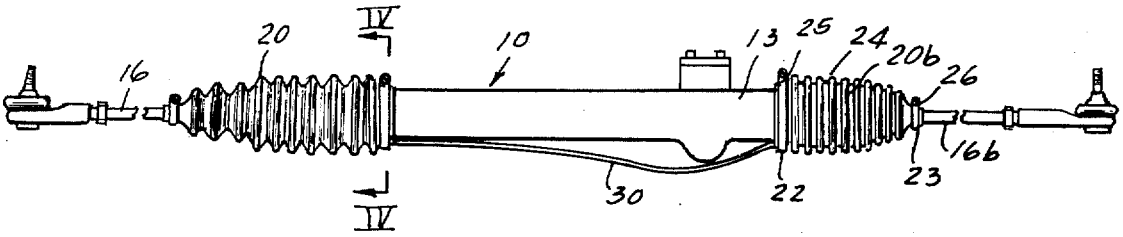
FIG. 2 is a plan view of a rack and pinion steering gear assembly equipped with a transfer tube according to this invention.

FIG. 1 illustrates a rack and pinion steering system 10 for controlling the attitude of the dirigible wheels 11 of a vehicle. The system 10 includes a pinion 11 controlled by the steering wheel 12 of a vehicle. The pinion is received in a housing 12 through which extends a rack bar received through a rack tube 13. The housing 12 is attached to the frame of a vehicle as is a housing member 14 positioned adjacent one end of the rack tube 13. Projecting beyond the ends of the rack tube are a pair of tie rods 16 which terminate in ball joints 17 attached to the steering bars 18 which in turn are attached to the wheels 11. The tie rods have their other ends attached to the rack bar by an articulatable joint. In order to seal the ends of the rack tube 13 from which the tie rods 16 project, boot seals or bellows seals 20 are provided. The seals also protect the tie rod rack bar connection. As best illustrated in FIG. 2, the bellows boot seals 20a and 20b have large-diameter ends 22 and small diameter axial ends 23 and a corrugated or bellows body 24 intermediate the ends 22, 23. The seals are preferably formed of rubber or other elastomer and are axially expansible and contractable as well as axially articulatable whereby one end may be bent at an angle to the other end.

The end 22 is attached around the rack tube 13 and held thereon as by a clamp 25. The end 23 is received around the tie rod 16 and attached thereto as by a clamp 26. Thus, when the tie rod 16 moves with respect to the rack tube 13, the bellows seal will move therewith, accommodating movement with either an expansion or a contraction of the seal or bending thereof.

FIG. 2 illustrates the steering assembly 10 with the tie rod 16a extended from the tube 13 and the tie rod 16b retracted in towards the tube 13. Thus, the bellows boot seal 20a is expanded while the bellows boot seal 20b is contracted.

In order to accommodate the changes in internal volume of the boot seals, while maintaining a seal at both the point of attachment of the end 22 and of the end 23, it is necessary to provide for pressure release from the contracting bellows and for fluid introduction to the expanding bellows.

It has been suggested to accommodate this through the use of a transfer tube such as the tube 30 which has its ends ported to the interior of the bellows. Normally, the tube is a fitted tube which has its ends fitted in bore openings in either the rack tube adjacent the bellows or in housing portions which receive the bellows. This has required extensive machining.

Figure 3:
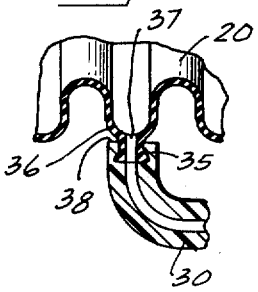
FIG. 3 is a fragmentary, cross-sectional view of one embodiment of this invention, illustrating the attachment of the transfer tube to the boot seal.

This invention provides for the attachment of the ends of the transfer tube 30 directly to the bellows, preferably through a molded opening to the interior of the bellows. FIG. 3 illustrates one embodiment of this invention wherein a nipple 35 is molded on the outer surface of one of the outer corrugations 36 of the bellows boot seal 20. The nipple has an opening 37 therethrough communicating to the interior of the bellows seal. The transfer tube 30 has its end 38 then received around the nipple and attached thereto. The attachment may be, as illustrated in FIG. 3, through a mating interfit which requires stretching of the tube to receive a flanged end of the nipple, which is receivable in an inner diameter glove in the tube, or by other means such as by way of example, the use of clamps, adhesives and the like.

Figure 4:
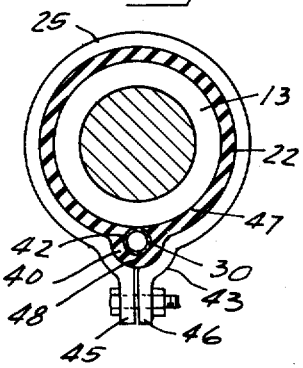
FIG. 4 is a view taken along the lines IV—IV of FIG. 2, illustrating another embodiment of this invention.

FIG. 4 illustrates another method of attaching the transfer tube 30 to the bellows boot seal. In this embodiment, the end 22 of the boot seal has a bulge 40 thereon with a bore 42 through the material of the bulge to the interior of the bellows seal axially beyond the end 22. The end of the transfer tube 30 is received through the opening 42 and extends into the bellows a distance sufficient to be open to the interior thereof. The clamp 25 can have a bulge area as at 43 codimensioned with the bulge 40 so as to be receivable therearound. Thus, when the clamp 25 is tightened, it will retain the seal 22 on the rack tube 13 and enclamp the end of the transfer tube 30 in the hole 42 of the bulge 40. It is to be understood that in the embodiment illustrated in FIG. 4, the bulge 43 on the clamp is adjacent the ends 45, 46 of the clamp. However, the bulge could be at another portion of the clamp.

As illustrated in FIG. 4, the hole 42 can take the form of a groove into the material of the bulge from the inner diameter 47 thereof, whereby the tube 30 is entrapped between the outer portion 48 of the bulge and the surface of the rack tube 13, or the hole 42 may be entirely through the material of the bulge 40 whereby the transfer tube 30 will be surrounded by material of the bulge and the contact with the surface of the rack tube will be formed entirely of materials of the boot seal.

In any event, in all of the above embodiments, it is clear that my invention provides for an attachment of a transfer tube to steering linkage seals independent of any machining of the parts of the linkage. In all embodiments, the ends of the transfer tube are ported directly to the interior of the bellows boot seal directly through an opening in the seal.

I claim as my invention:

[1. In a steering linkage having two spaced-apart boot seals, the seals sealing an area which includes the juncture of two relatively axially movable telescoped members, opposite ends of the seals attached one end to one of the members, the other end to the other member, the seals capable of changing in internal volume, and a fluid transfer tube communicating the interiors of the seals to transfer fluid from one seal to the other, the improvement of porting the interior of the tube to the interior of the seals through openings through the bodies of the seals.]

[2. The improvement of claim 1 wherein the molded opening constitutes a nipple on an outer surface of the seal, the nipple having an opening therethrough to the interior of the seal, the nipple receiving the end of the transfer tube.]

*3. In a steering linkage having two spaced-apart boot seals, the seals sealing an area which includes the juncture of two telescoped members, opposite ends of the seals attached one end to one of the members, the other end to the other member, the seals capable of changing in internal volume, and a fluid transfer tube communicating the interiors of the seals to transfer fluid from one seal to the other, the improvement of porting the interior of the tube to the interior of the seals through openings through the bodies of the seals,* [The improvement of claim 1 wherein the] *said* opening [is] *being* a molded opening through a portion of an axial end ring wall of the seal, the opening receiving an end of the transfer tube.

4. The improvement of claim 3 wherein said end of the said transfer tube is enclamped between a portion of the said end ring wall of the seal and a rigid member around which the seal is positioned.

*5. In a steering linkage having two spaced-apart boot seals, the seals sealing an area which includes a juncture of two telescoped members, opposite ends of the seals attached at one end of one of the members and the other end to another member, said seals changing in internal volume in inverse proportion to one another during relative axial movement of said members, a fluid transfer*

*tube communicating the interiors of the seals to transfer fluid from the interior of one seal to the interior of the other seal in response to changes in the internal volume of the seals, said seals having axial end portions defining axially facing end surfaces each of which lie in a plane extending transverse to said one of said members, at least one of said axial end portions surrounding said one of said members and having an opening extending from the interior thereof and intersecting said axially facing end surface, said transfer tube having an end received in said opening, and a clamp member for clamping said axial end portion in said surrounding relationship with said one of said members and for clamping said transfer tube in said opening therein.*

* * * * *